Patented Aug. 12, 1924.

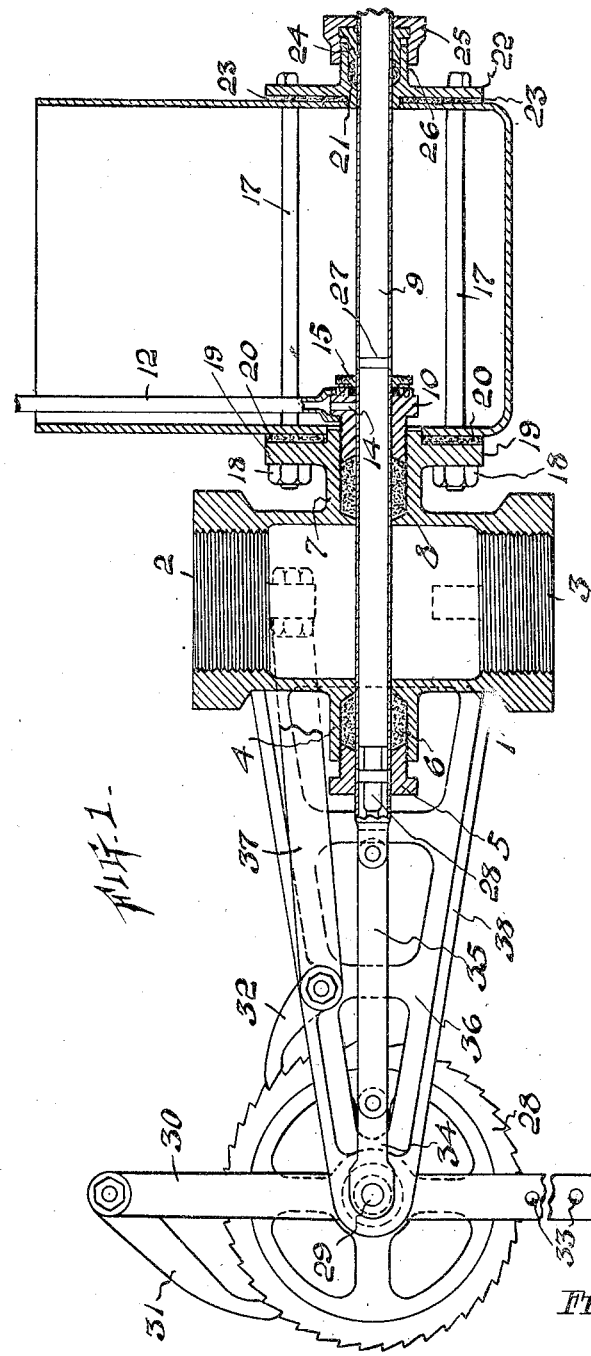

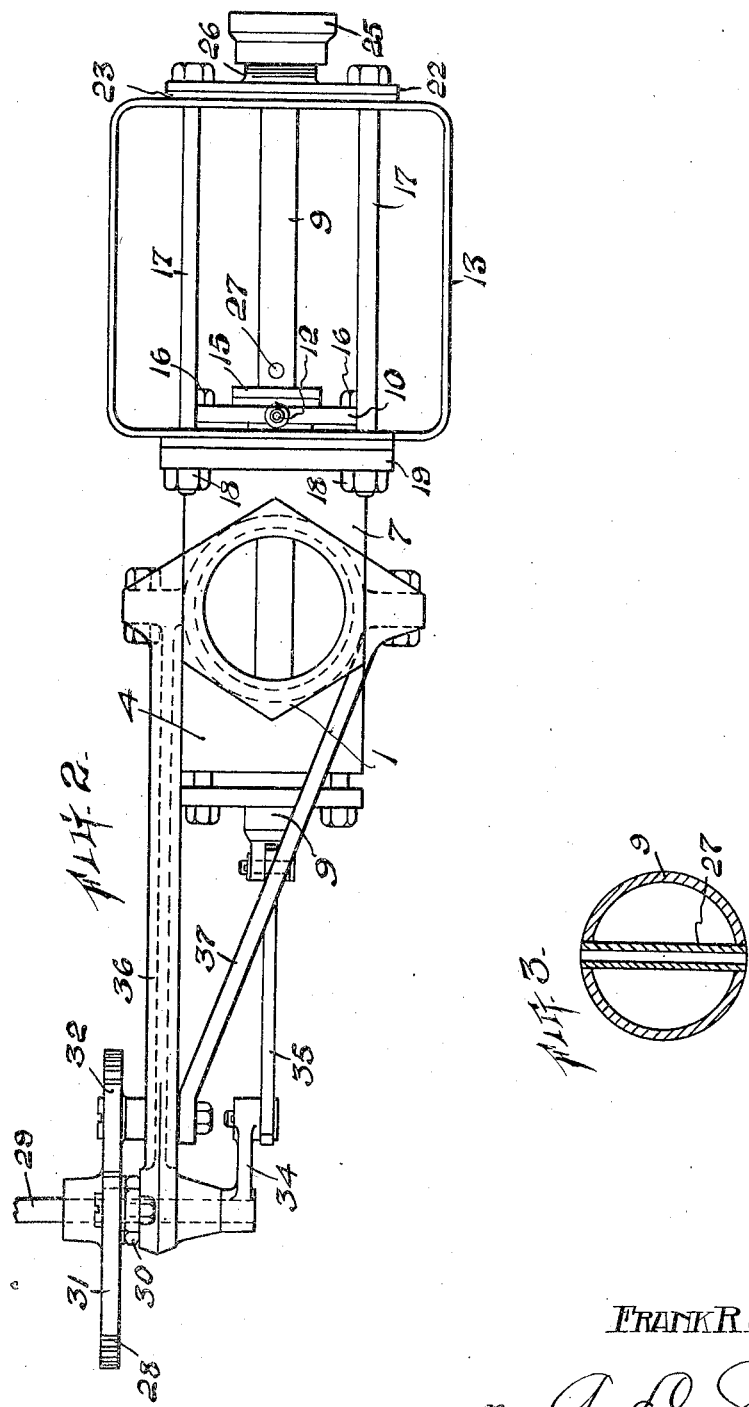

1,504,525

UNITED STATES PATENT OFFICE.

FRANK R. SPINNEY, OF FORT WORTH, TEXAS, ASSIGNOR, BY MESNE ASSIGNMENTS, TO THE VALVELESS LUBRICATOR CO., OF FORT WORTH, TEXAS, A CORPORATION OF TEXAS.

VALVELESS LUBRICATOR.

Application filed November 22, 1921. Serial No. 517,004.

*To all whom it may concern:*

Be it known that I, FRANK R. SPINNEY, a citizen of the United States of America, residing at Fort Worth, in the county of Tarrant and State of Texas, have invented certain new and useful Improvements in Valveless Lubricators, of which the following is the specification.

My invention relates to lubricators and more particularly to valveless lubricators; and the object is to provide a simple device for lubricating purposes and which is adapted to deliver lubricating material to steam lines and which is simple in construction and operation, and which may be actuated in any suitable manner. Another object is to provide a device for injecting lubricant into the steam line without resistance. Other objects and advantages will be fully explained in the following description and the invention will be more particularly pointed out in the claims.

Reference is had to the accompanying drawings which form a part of this application.

Fig. 1 is a vertical section of the lubricator and a side elevation of the driving mechanism connected therewith.

Fig. 2 is a plan view of the same.

Fig. 3 is a vertical cross section of the reciprocating feed plunger.

Similar characters of reference are used to indicate the same parts throughout the several views.

The lubricator includes a body coupling member 1 which may be interposed in a steam line at some convenient or advantageous point in the line for lubricating purposes. The member 1 is threaded interiorly at the ends 2 and 3 to be screwed on the steam line pipe. The member 1 has bearing members 4 and 7 formed on opposite sides thereof, and these bearing members are perforated to form a passage or race for a reciprocating grease carrying plunger 9, and also to form packing glands 6 and 8. The packing gland 6 is closed by a perforated bearing plug 5 which forms a bearing for the plunger 9. The plug 5 may be screwed into the bearing member 4. The packing gland 8 is closed by a flanged bearing plug 10. This plug 10 is perforated to receive and form a bearing for the plunger 9. The plug 10 has an opening 11 to form a steam release and a pipe 12 is connected to the plug 10 to direct the steam out of the oil tank 13 to prevent the cutting or emulsifying of the grease in the tank. In order to prevent any steam from entering the grease or oil tank 13, a gasket 14 is countersunk in the bearing plug 10 about the plunger 9 and a perforated flanged cap 15 is clamped on the gasket 14 by screw bolts 16.

The grease tank 13 is attached to the flanges 19 of the coupling member 1 by bolts 17 and nuts 18. The bearing member 7 has lateral flanges 19 and the bolts 17 project entirely through the grease tank 13 and through the flanges 19. Gaskets 20 are placed between the flanges 19 and the tank 13 for sealing the grease tank about the perforation which is made for the end of the bearing member 7. The plunger 9 reciprocates entirely through the grease tank 13. A packing gland 21 is formed about the plunger 9 by means of a flanged casting 22 which has a boss projecting into the grease tank 13 and which is attached to the grease tank by means of the bolts 17. A gasket 23 is placed between the casting 22 and the wall of the grease tank 13. A bearing plug 24 projects into the boss on the casting 22 for enclosing the packing 21 and a perforated cap 25 is screwed on the boss 26 to hold the bearing plug 24 in place.

The plunger rod 9 is hollow to form an air cooled plunger and a tube 27 is fixed therein to form a pocket to receive a charge of grease from the tank 13. The plunger 9 can thus be air cooled, which is necessary on account of passing through the steam line. The pipe 9 is slotted at 28 so that the opening will be entirely through the plunger to receive air. The plunger may be reciprocated in any suitable manner. A ratchet wheel 28' is fixedly mounted on a shaft 29. An actuating bar 30 is loosely mounted on the shaft 29 and provided with a gravity pawl 31 for moving the wheel 28'. A locking pawl 32 cooperates with the pawl 31. The bar 30 may be actuated by any suitable link bar or pitman rod (not shown) which may be connected to the bar 30 at different points by reason of the holes 33 for varying the throw of the pawl 31. A crank 34 is rigid with shaft 29 and a pitman rod 35 is pivotally connected to the crank 44 and pivotally connected to the plunger 9. The shaft 29 is journaled in a frame 36 which is rigid with the flange bearing member 4 and coupling member 1. Braces 37 and 38 are employed to make the frame 36 and coupling member 1 rigid with each other.

The plunger 9 will be reciprocated in the coupling member 1 and in the grease or oil tank 13. A charge of grease will be caught in the pocket 27 and when this pocket comes in line with the steam line in coupling 1, the steam will drive the oil out of pocket 27 into the steam line for lubricating purposes. As the plunger 9 carries the pocket 27 back towards the grease tank 13, there will be a charge of steam in the pocket 27 by reason of the steam pressure. This steam will escape through the release tube 12 as the pocket 27 passes the opening in the casting 10 which communicates with the tube 12.

What I claim is:

1. A lubricator comprising a body coupling member to be interposed in a steam line and having bearing members, and a race therein and through said bearing members, packing glands formed in said bearing members, an air-cooled plunger provided with an oil carrying pocket and being hollow throughout its length and ends for circulation of air, means for reciprocating said plunger through said bearings and said coupling member, and means for charging said pocket with a lubricant.

2. A lubricator comprising a body coupling member to be interposed in a steam line to form a part of the steam line and having bearing members and a race therethrough, perforated bearing plugs cooperating with said bearing members, an air-cooled plunger reciprocating through said plugs and bearing members and said coupling at right angles to said steam line and provided with a lubricant carrying pocket for injecting the lubricant into the steam line and being hollow throughout its length and ends for circulation of air, and means for automatically charging said pocket with a lubricant.

3. A lubricator comprising a body coupling member to be interposed in a steam line to form a part of the steam line and provided with bearing members on both sides thereof, perforated bearing plugs connected to and cooperating with said bearing members, said bearing members and said plugs forming packing glands, an air-cooled plunger reciprocating through said plugs and bearing members and packing glands at right angles to the steam line and provided with a lubricant carrying pocket for injecting lubricant into the steam line and being hollow throughout its length and ends for circulation of air, and means for automatically charging said pocket with a lubricant.

4. A lubricator comprising a body coupling member to be interposed in a steam line to form a part of the steam line and having bearing members on opposite sides thereof provided with packing glands, an air-cooled plunger reciprocating through said bearing members and said coupling member and provided with a lubricant carrying pocket for injecting a lubricant into the steam line and being hollow throughout its length and ends for circulation of air, a tank for automatically charging said pocket with a lubricant, and means for releasing steam from said pocket before the pocket reaches said tank.

5. A lubricator for injecting a lubricant into the steam line comprising a grease tank and an air cooled plunger provided with a lubricant carrying pocket to be reciprocated in said tank and in the steam line at right angles to the direction of the steam line.

In testimony whereof, I set my hand, this 10th day of November, 1921.

FRANK R. SPINNEY.